United States Patent [19]
Robsky et al.

[11] Patent Number: 5,838,309
[45] Date of Patent: Nov. 17, 1998

[54] SELF-TENSIONING MEMBRANE TOUCH SCREEN

[75] Inventors: Stephen Richard Robsky, Sutton, Mass.; Bernard O. Geaghan, Salem, N.H.; Stephen Atwood, Worcester, Mass.; Michael Woolstrum, Round Rock, Tex.

[73] Assignee: MicroTouch Systems, Inc., Methuen, Mass.

[21] Appl. No.: 725,877

[22] Filed: Oct. 4, 1996

[51] Int. Cl.⁶ .............................. G08C 21/00; G09G 5/00
[52] U.S. Cl. ...................... 345/173; 345/174; 178/18.01; 178/18.04
[58] Field of Search ...................... 345/173, 174; 178/18.01, 18.02, 18.03, 18.04, 20.01

[56] References Cited

U.S. PATENT DOCUMENTS

| | | | |
|---|---|---|---|
| 4,319,078 | 3/1982 | Yokoo et al. | 178/18 |
| 4,455,450 | 6/1984 | Margolin | 178/18 |
| 4,564,079 | 1/1986 | Moore et al. | 178/18 |
| 5,262,778 | 11/1993 | Saunders | 178/18 |

*Primary Examiner*—Vijay Shankar
*Attorney, Agent, or Firm*—Iandiorio & Teska

[57] ABSTRACT

A digitizer including a support structure defining a digitizer area and a spacer element; a tensioned membrane disposed in spaced relationship to the support structure on the spacer element; and a peripheral flexible member extending from the support structure and including at least two independently flexible sections attached to the membrane and pretensioned counter to the tension of the membrane for deflecting and maintaining tension on the membrane to sustain the spaced relationship with the membrane relative to the structure.

25 Claims, 5 Drawing Sheets

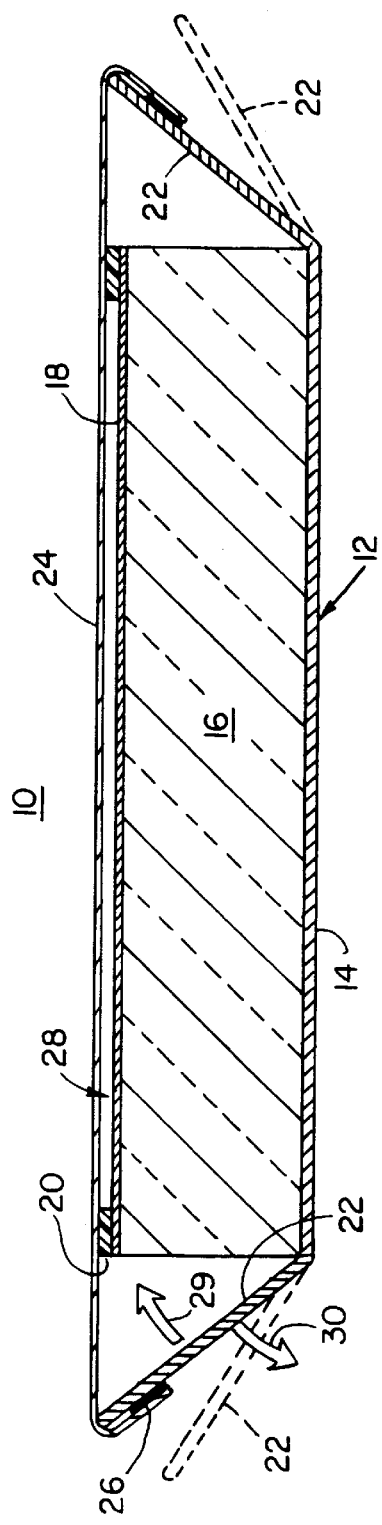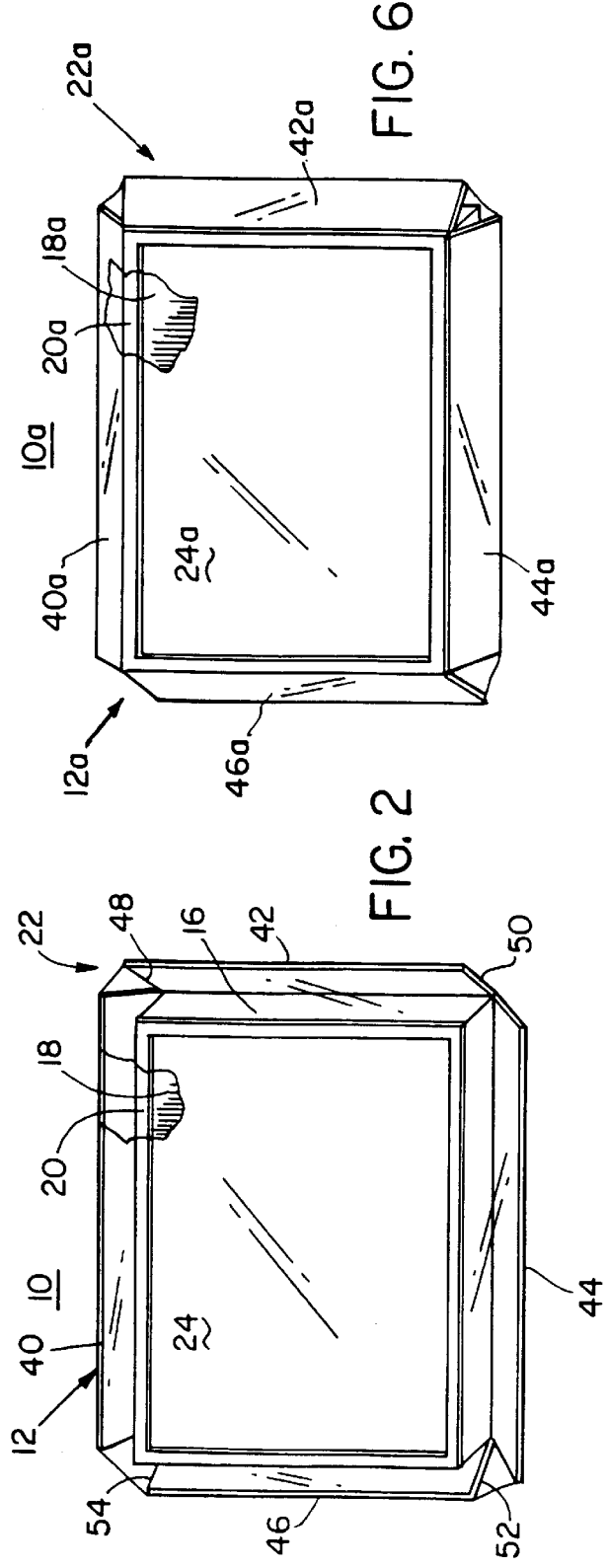

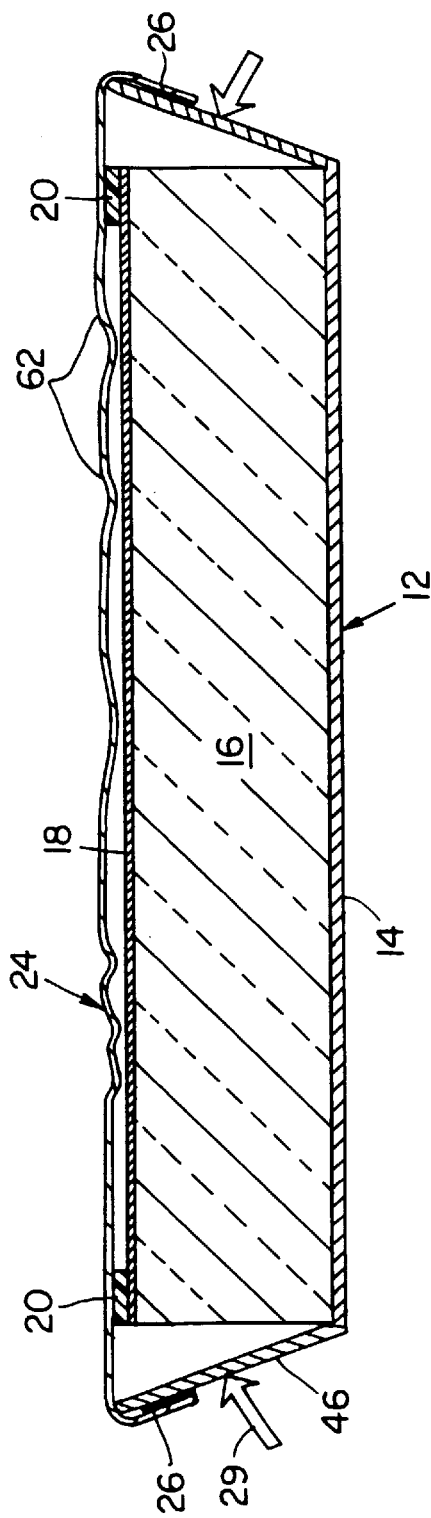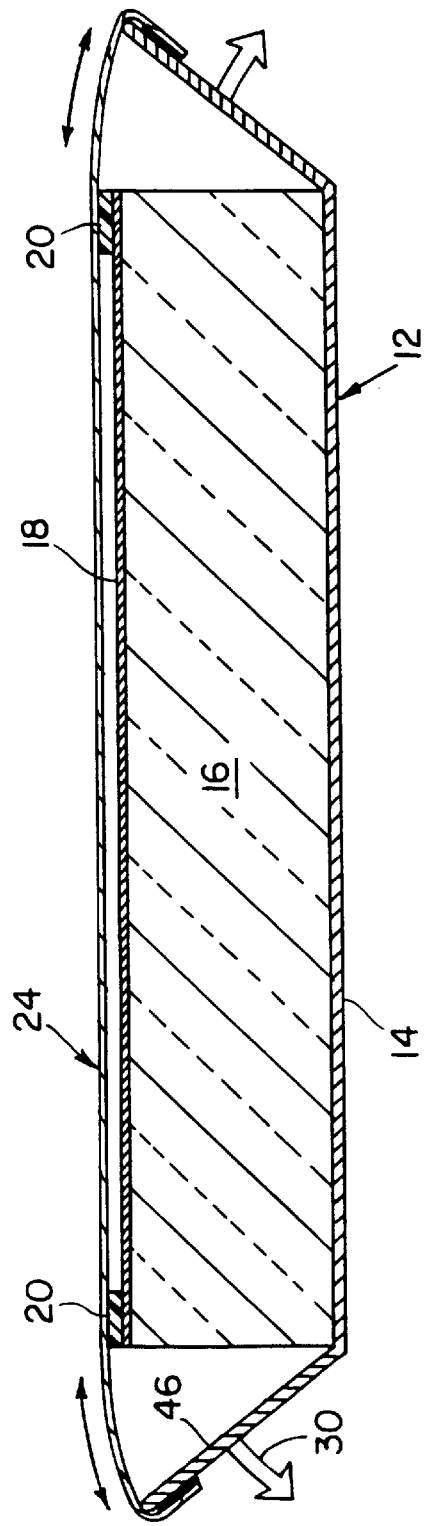
FIG. 3A
FIG. 3B

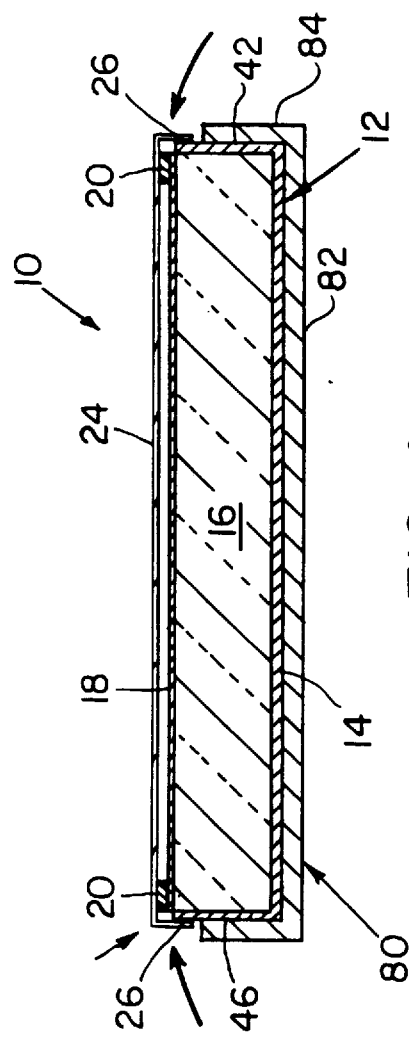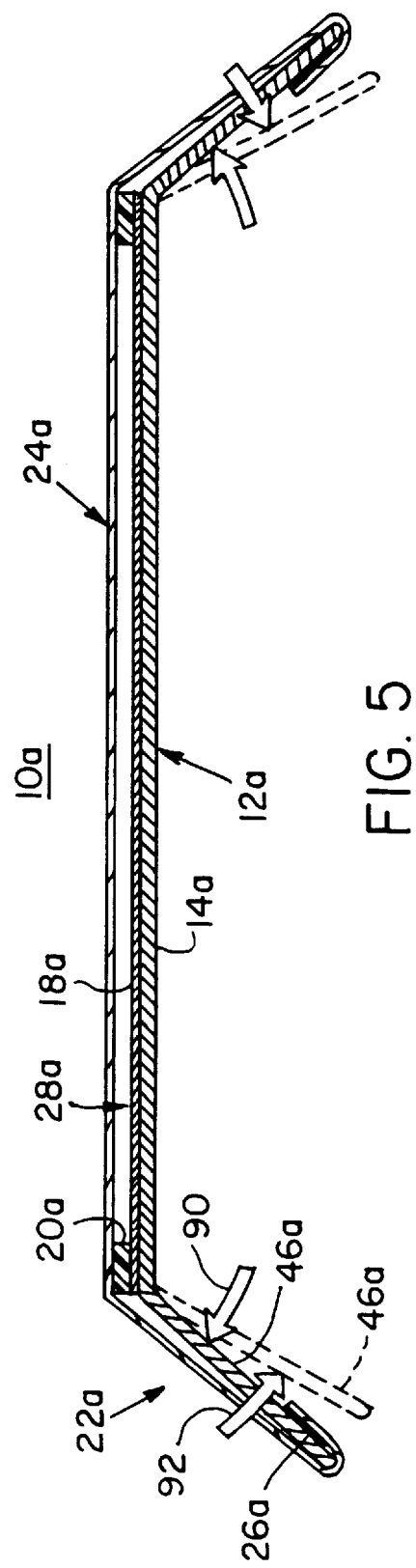

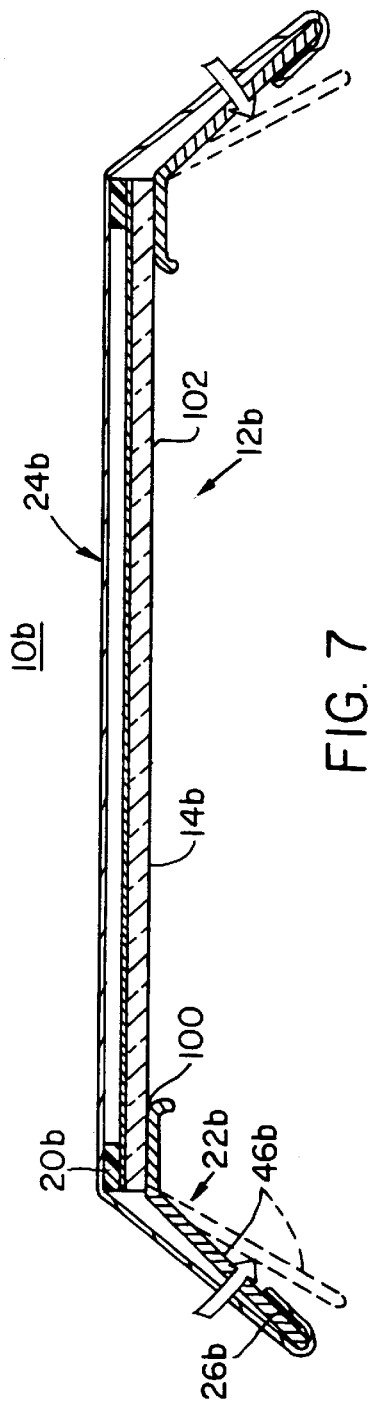
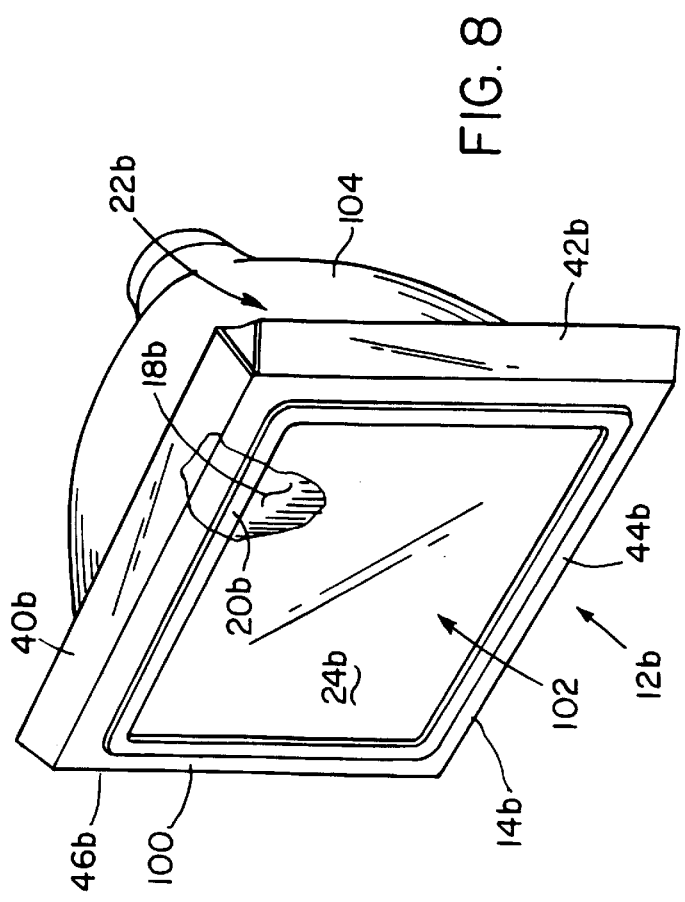

SELF-TENSIONING MEMBRANE TOUCH SCREEN

FIELD OF INVENTION

This invention relates to a self-tensioned membrane digitizer.

BACKGROUND OF INVENTION

Tensioned membrane digitizers employ a conductive membrane stretched tautly over and spaced from a conductive substrate. A touch or pressure on the membrane deflects it to touch the substrate and make electrical contact. By analyzing the current or voltage change induced by the touch, the position of the touch on the screen can be determined. While such membrane digitizers are a reliable and inexpensive means of implementing a digitizer they have a serious shortcoming: the membrane must never be allowed to sag and touch the substrate. Sagging can occur due to long term fatigue of the membrane and more frequently because of the expanding of the membrane due to increases in humidity and/or temperature. One approach to the problem employs a multiplicity of spaced beads or "spacer dots" to separate the membrane and support substrate. U.S. Pat. No. 3,911,215 issued to Hurst, et al. discloses and claims a planar digitizer for use with a stylus having insulating spacer dots dispersed between membranes and a substrate. U.S. Pat. No. 4,220,815, issued to Gibson et al., discloses and claims a nonplanar touch digitizer having insulated spacer dots dispersed between a membrane and a substrate. U.S. Pat. No. 5,220,136, issued to Kent, discloses and claims a touch digitizer having insulating spacer dots dispersed in a particular pattern between a membrane and a substrate. The insulating spacer dots prevent the inadvertent contact of the membrane and permits contact when the user presses on the outer membrane.

Spacer dots may adversely affect the electronically measured path of a stylus or finger as it moves along the outer surface, because the path will travel along insulated dots. Also, the insulated dots may cause a discontinuous or a jagged line to be electronically measured as a stylus traverses over an insulated dot, which interrupts the electrical contact. The critical spacing of the insulated dots to maintain a consistent gap between the membranes is difficult to maintain, as evidenced by the patents referenced above. Spacer dots are also expensive to implement for large digitizer areas.

In another approach, the tensioned membrane is held taut by manually adjusting edge mounting rails to a fixed position at the time of manufacture, thus applying substantial tension to the membrane. Smart Technology, Inc. located in Calgary, Canada has a commercially available whiteboard utilizing this tension method. This leads to a performance tradeoff. If the membrane is very highly tensioned, excessive force is required to make electrical contact, and long term reliability is questionable. With less tension, moisture absorption or temperature rise can cause the membrane to expand and sag toward the support substrate and touch the substrate providing an erroneous position signal. The Smart Technology device does not include any mechanism to automatically adjust the tension of the outer membrane due to environmental changes in temperature or humidity.

SUMMARY OF INVENTION

It is therefore an object of this invention to provide a self-tensioning membrane digitizer.

It is a further object of this invention to provide such a self-tensioning membrane digitizer which automatically deflects to maintain the tension in the membrane to keep it spaced from the underlying substrate.

It is a further object of this invention to provide such a self-tensioning membrane digitizer which accommodates expansion and contraction of the membrane due to age or fatigue or changes in humidity or temperature.

The invention results from the realization that a truly self-tensioning membrane digitizer can be effected by attaching the membrane in a support structure that includes flexible walls which are pretensioned to deflect and maintain tension on the membrane to keep it spaced from the substrate despite expansion or contraction of the membrane. This invention features a self-tensioning membrane digitizer including a support structure defining a digitizer area and including spacer means. There is a tensioned membrane disposed in spaced relationship to the support structure on the spacer means and a peripheral flexible member extending from the support structure and including at least two independently flexible sections. The flexible sections are attached to the membrane and pretensioned counter to the tension of the tensioned membrane for deflecting to maintain tension on the membrane to sustain the spaced relationship of the membrane relative to the structure.

In a preferred embodiment the flexible sections may be pretensioned outward relative to the frame or they may be pretensioned inward relative to the frame. The frame may be an nsided polygon with n flexible sections, or an n-sided polygon with n/2 flexible sections. The support structure may include a base and a support substrate mounted on the inside of the base. The spacer means may be mounted on the support substrate and the flexible sections may extend away from the base and toward the digitizer area. The support structure may include a base and the spacer means may be mounted on the outside of the base. The flexible sections may extend away from the base and away from the digitizer area. The flexible member may have four sections. The base may include a frame and a transparent portion surrounded by the frame. The base and the flexible sections may be integral. The support structure may include a conductive surface on the substrate or on the base.

DISCLOSURE OF PREFERRED EMBODIMENT

Other objects, features and advantages will occur to those skilled in the art from the following description of a preferred embodiment and the accompanying drawings, in which:

FIG. 1 is a side schematic cross-sectional elevational view of a self-tensioning membrane digitizer according to this invention in which the walls are pretensioned outwardly;

FIG. 2 is a top three-dimensional view of the self-tensioning membrane digitizer of FIG. 1;

FIG. 3A is a view similar to FIG. 1 showing the self-tensioning membrane digitizer of this invention while the membrane is being installed;

FIG. 3B is a view similar to FIG. 3A with the pretensioned wall released after the membrane has been attached;

FIG. 4 shows a jig which can be used to pretension the wall in FIGS. 3A and 3B while the membrane is being attached;

FIG. 5 is a view similar to FIG. 1 in which the walls are pretensioned inwardly to maintain the tension on the membrane FIG. 6 is a top three-dimensional view of the self-tensioning membrane digitizer of FIG. 5;

FIG. 7 is a view similar to that of FIG. 5 wherein the wall sections are separate from the base and the base has a transparent or hollow center portion surrounded by a frame;

FIG. 8 is a three-dimensional view of the self-tensioning membrane digitizer of FIG. 7 used in conjunction with a CRT;

Figure 9:
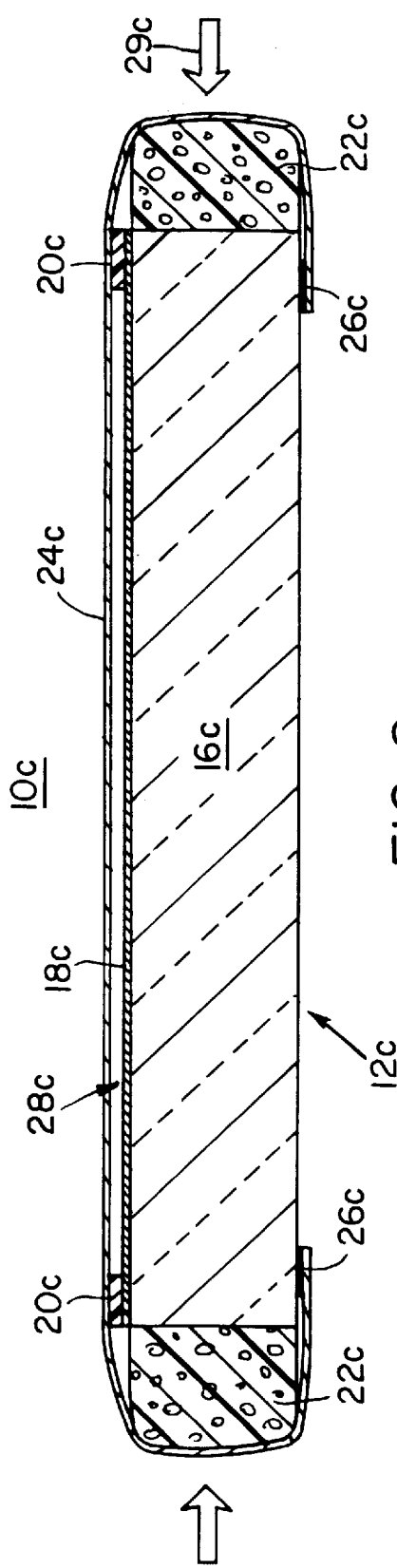
FIG. 9 is a side schematic cross-sectional elevational view of a self-tensioning membrane digitizer according to this invention in which the membrane is tensioned using peripheral compressible sections of foam or rubber.

There is shown in FIG. 1 a self-tensioned membrane digitizer 10 according to this invention including a support structure 12 having a base 14 and substrate support 16 on which is mounted a coating or conductive surface 18 on which is located spacing means such as peripheral rail 20. Extending upward from base 14 is peripheral flexible wall 22 to which is attached conductive membrane 24. Spacing means 20 is a suitable insulator such as plastic. Conductive surface 18 may be an electrically resistive sheet material such as carbon or Indium Tin Oxide, and substrate spacer 16 may be formed of polystyrene or polyurethane foam, or glass. Base 14 may be metal or plastic and may be separate or integrally formed with peripheral flexible wall 22. Membrane 24 has a conductive material such as carbon or Indium Tin Oxide on its inner surface. Membrane 24 is attached at 26 to wall 22 by means of an adhesive. Flexible wall 22 is pretensioned by pushing inwardly as indicated by arrow 29 toward base 14 and toward digitizer area 28 before membrane 24 is attached to wall 22 at 26. Initially flexible wall 22 assumes the position as shown in phantom while subsequently it assumes the pretention position as shown in full lines 22. In that condition, flexible wall 22 applies a counter tensioning force as indicated by arrow 30 which pulls membrane 24 taut across digitizer area 28 over spacer 20

In FIG. 2 it is apparent that the peripheral flexible wall 22 includes a plurality, in this case four, flexible sections 40, 42, 44 and 46, each independently flexible by virtue of the V-shaped notches or cutouts 48, 50, 52 and 54 at the junction of these walls. In some cases flexible sections 40 and 44 may be eliminated. Substrate 16 rests on base 14, and supports peripheral spacer rail 20 which maintains the separation between membrane 24 and conductive surface 18. The pretensioning of flexible wall 22 is done simply by applying a lateral force 29, FIG. 3A, to each of the flexible wall sections, for example section 46, while membrane 24 is being attached at 26 to flexible section 46. In this condition, membrane 24 is loose and contains wrinkles and rumples as shown at 62. Once force 29 is released the pretensioned section 46, FIG. 3B, draws membrane 24 tight, eliminating wrinkles and rumples forcing membrane 24 tight and safely separated over spacer 20 from conductive surface 18 on substrate 16. In this pretensioned condition, any expansion or contraction will be accommodated by a deflection outwardly or inwardly, respectively, of section 46 and its counterpart sections so that an opposing or counter tension or force, arrow 30, is always being applied to membrane 24 to keep it taut and away from surface 18.

One simple technique for attaching the membrane to the flexible walls is shown in FIG. 4, where a shallow jig or box 80 having a base 82 receives self-tensioning membrane digitizer 10, forcing its peripheral flexible wall 22 including all four sections inwardly while membrane 24 is attached to flexible wall 22. When the attachment is complete, digitizer 10 can be removed from box or jig 80. It should be understood that while the peripheral flexible wall is shown as generally rectangular in shape throughout this specification, that is not a necessary limitation of the invention as it could be three-walled, five-walled, or any number of walls that is convenient so long as it defines an area, that is, two-dimensional space. Also while examples show flexible walls on both opposing walls of each dimension, is it possible to achieve self tensioning with one end fixed, and the opposing end supported by the flexible support shown.

In FIGS. 1–4 digitizer 10 is depicted with membrane 24 being attached across the open end of structure 12. This is not a necessary limitation. As shown in FIG. 5, digitizer 10a can be constructed so that spacer 20a is on the outside of base 14a as is conductive surface 18a. Membrane 24 is then stretched across the outside of base 14a over spacer member 20a around flexible peripheral wall 22a, and is attached now at the inside 26a of flexible wall 22a as, opposed to the embodiment of digitizer 10, FIGS. 1–4, in which membrane 24 was attached at 26 on the outside of section 46 and the other sections of wall 22.

In further contrast, digitizer 10a, FIG. 5, requires a force to be applied outwardly and away from base 14a in digitizer area 28a as indicated by arrow 90 while the membrane is attached to wall 22a. After the attachment is complete at 26a, the now pretensioned wall 22a tends to return to its initial position, exerting a tensioning force 92 which stretches membrane 24 tautly over spacers 20a establishing a separation between membrane 24 and conductive surface 18a. Any variation in temperature or humidity or other factors such as aging which may cause the membrane to expand or contract, will be accommodated for by a counter deflection of section 46a which thereby maintains the tension on membrane 24a to ensure its separation from conductive coating 18a.

After the membrane is secured, digitizer 10a with its pretensioned sections 40a, 42a, and 46a appear as shown in FIG. 6. In another construction, digitizer 10b, FIG. 7, is constructed similarly to digitizer 10a with the exception that peripheral wall 22b is not integral with base 14b and base 14b is formed in the shape of a frame 100, FIG. 8 surrounding a transparent center portion 102. Digitizer 10b is well adapted for use in conjunction with a conventional CRT.

The pretensioning of the peripheral flexible wall 22 in each construction is effected so that there is always a sufficient tension maintained on membrane 24 to keep it separated from conductive coating 18a so that whether membrane 24 expands or contracts, peripheral flexible wall 22 and its sections 40, 42, 44 and 46 will be deflected accordingly and will maintain a sufficient tension on the membrane. For example, with a base 2.5 feet square made of cold rolled steel and the flexible wall sections made of 26 gauge cold rolled steel and a membrane of laminated polyester and polypropolene 0.006 thick, a typical tension that will be maintained is approximately 50 pounds, distributed along each edge, in keeping with a deflection of the wall sections through an angle of about 0.10 inch.

In another embodiment, digitizer 10c, FIG. 9, instead of utilizing peripheral walls, such as wall 22, FIG. 1, to provide the tensioning, utilizes peripheral compressible members, such as member 22c, which may be a section of compressible foam, silicone, or rubber. Peripheral compressible member 22c is pretensioned by compressing it inwardly toward substrate 16c in the direction of arrow 29c. Then, membrane 24c is affixed to the bottom of substrate 16c at 26c by means of an adhesive. When the compression on compressible member 22c is released, it pulls membrane 24c taught across digitizer area 28c over spacer 20c.

Figure 10:
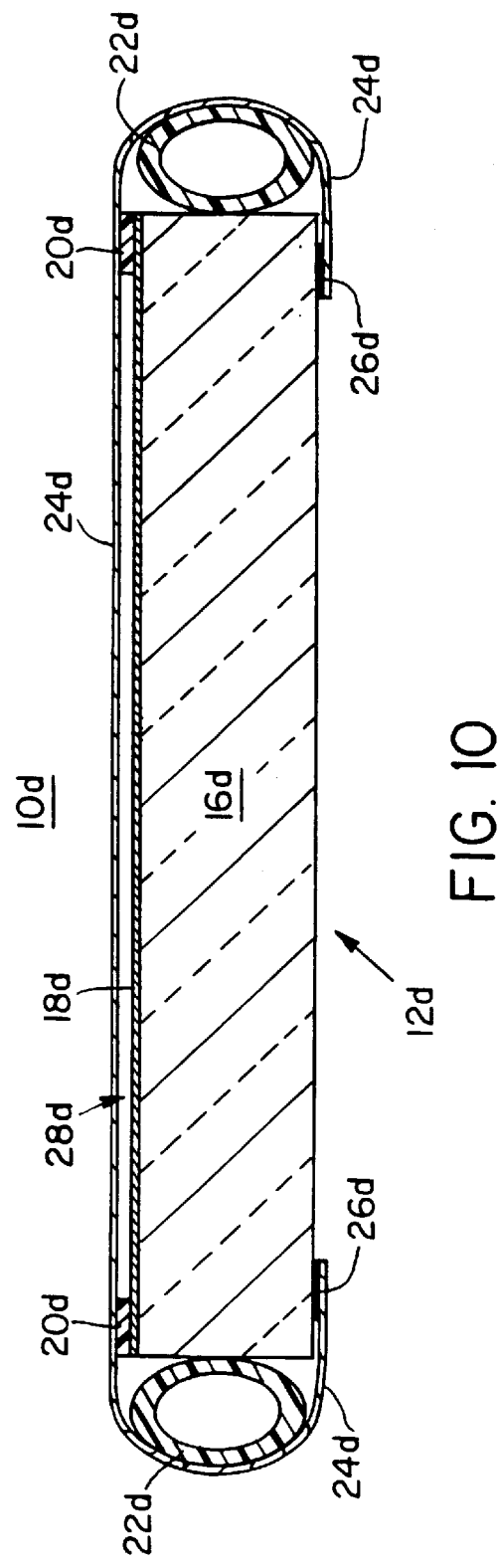
FIG. 10 is a side schematic cross-sectional elevational view of a self-tensioning membrane digitizer according to this invention in which the membrane is tensioned using peripheral compressible sections a compressible rubber tube.

In yet another embodiment, digitizer 10d, FIG. 10, utilizes compressible tubes, such as tube 22d, in place of either the peripheral flexible walls or the sections of compressible foam or rubber.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A self-tensioning membrane digitizer comprising:
   a support structure defining a digitizer area and including spacer means;
   a tensioned membrane disposed in spaced relationship to said support structure on said spacer means; and
   a peripheral flexible member extending from said support structure and including at least two independently flexible sections attached to said membrane and pretensioned counter to the tension of said tensioned membrane for deflecting to maintain tension on said membrane to sustain the spaced relationship with the membrane relative to the structure.

2. The self-tensioning membrane digitizer of claim 1 in which said flexible sections are pretensioned outward relative to said support structure.

3. The self-tensioning membrane digitizer of claim 1 in which said flexible sections are pretensioned inward relative to said support structure.

4. The self-tensioning membrane digitizer of claim 1 in which said support structure is an n-sided polygon and there are n flexible sections.

5. The self-tensioning membrane digitizer of claim 1 in which said support structure is an n-sided polygon and there are n/2 flexible sections.

6. The self-tensioning membrane digitizer claim 1 in which said support structure includes a base and a support substrate mounted on the inside of said base, said spacer means being mounted on said support substrate, said flexible sections extending away from said base and toward said digitizer area.

7. The self-tensioning membrane digitizer of claim 1 in which said support structure includes a base, said spacer means being mounted on the outside of said base, and said flexible sections extending away from said base and away from said digitizer area.

8. The self-tensioning membrane digitizer of claim 1 in which said base includes a frame and a transparent portion surrounded by said frame.

9. The self-tensioning membrane digitizer of claim 1 in which flexible member has four said sections.

10. The self-tensioning membrane digitizer of claim 6 in which said base and flexible sections are integral.

11. The self-tensioning membrane digitizer of claim 1 in which said flexible sections are compressible foam.

12. The self-tensioning membrane digitizer of claim 1 in which said flexible sections are compressible silicone member.

13. The self-tensioning membrane digitizer of claim 6 in which said support structure includes a conductive surface on said substrate.

14. The self-tensioning membrane digitizer of claim 6 in which said support structure includes a conductive surface on said base.

15. A self-tensioning membrane digitizer comprising:
    a support structure defining a digitizer area;
    a membrane disposed in spaced relationship to said support structure; and
    a flexible member attached to said support structure and in contact with said membrane, said flexible member biased to tension said membrane and to maintain a spaced relationship of the membrane relative to the digitizer area.

16. The self-tensioning membrane digitizer of claim 15 in which said flexible member is pretensioned outward relative to said support structure.

17. The self-tensioning membrane digitizer of claim 15 in which said flexible members is pretensioned inward relative to said support structure.

18. The self-tensioning membrane digitizer of claim 15 in which said support structure is an n-sided polygon and there are n flexible members, one on each side thereof.

19. The self-tensioning membrane digitizer of claim 15 in which said support structure is an n-sided polygon and there are n/2 flexible members.

20. The self-tensioning membrane digitizer of claim 15 in which said support structure includes a base and a support substrate mounted on the base, a spacer means mounted on said support substrate, said membrane stretched over said spacer means, said flexible member extending upwards from said base.

21. The self-tensioning membrane digitizer of claim 15 in which said support structure includes a base, a spacer means mounted on the base, said flexible member extending downward from said base.

22. The self-tensioning membrane digitizer of claim 15 in which said base includes a frame and a transparent portion surrounded by said frame.

23. The self-tensioning membrane digitizer of claim 15 in which said flexible member is a compressible foam material.

24. The self-tensioning membrane digitizer of claim 15 in which said flexible member is a compressible silicone member.

25. The self-tensioning membrane digitizer of claim 15 in which said support structure includes a conductive surface on a substrate.

* * * * *